United States Patent [19]
Fagnant et al.

[11] Patent Number: 5,851,333
[45] Date of Patent: Dec. 22, 1998

[54] METHOD OF FORMING ROLLS OF WEBS INCLUDING PERFORATED AND PEELABLE LID SHAPES

[75] Inventors: Anthony G. Fagnant, Libertyville; Joseph A. Sykes, Grayslake, both of Ill.

[73] Assignee: Label Makers, Inc., Pleasant Prairie, Wash.

[21] Appl. No.: 837,781

[22] Filed: Apr. 22, 1997

[51] Int. Cl.⁶ ..................................................... B32B 31/00
[52] U.S. Cl. .......................... 156/252; 156/192; 156/253; 156/256; 156/263; 156/270; 156/267; 215/298; 222/480; 222/565; 220/270; 220/359
[58] Field of Search .................................. 156/267, 263, 156/256, 192, 270, 269, 252, 253, 277; 222/565, 480; 215/232, 230, 251, 298, 349; 220/257, 256, 359, 270

[56] References Cited

U.S. PATENT DOCUMENTS

| | | | |
|---|---|---|---|
| 2,776,787 | 1/1957 | Nicol | 222/544 |
| 4,300,969 | 11/1981 | Frydendal | 156/244.11 |
| 4,530,230 | 7/1985 | Monks | 72/363 |
| 4,549,917 | 10/1985 | Jensen, Jr. | 156/108 |
| 4,657,614 | 4/1987 | Andersson | 156/244.11 |
| 5,513,781 | 5/1996 | Ullrich et al. | 222/565 |
| 5,676,787 | 10/1997 | Rusincovitch et al. | 156/277 |

*Primary Examiner*—David A. Simmons
*Assistant Examiner*—Linda L. Gray
*Attorney, Agent, or Firm*—Reising, Ethington, Learman & McCulloch, PLLC

[57] ABSTRACT

A method of converting, on an in-line printing press, two webs of material into a roll including a web and a plurality of peelable lids thereon. Alternatively, a plurality of underlying lids can be formed from the other web of the roll, in registration with the peelable lids, where these lids are created by die cutting the two webs while bonded. Also, one of the lids has dispensing holes and the other lid is printed with selected indicia and/or logos.

10 Claims, 4 Drawing Sheets

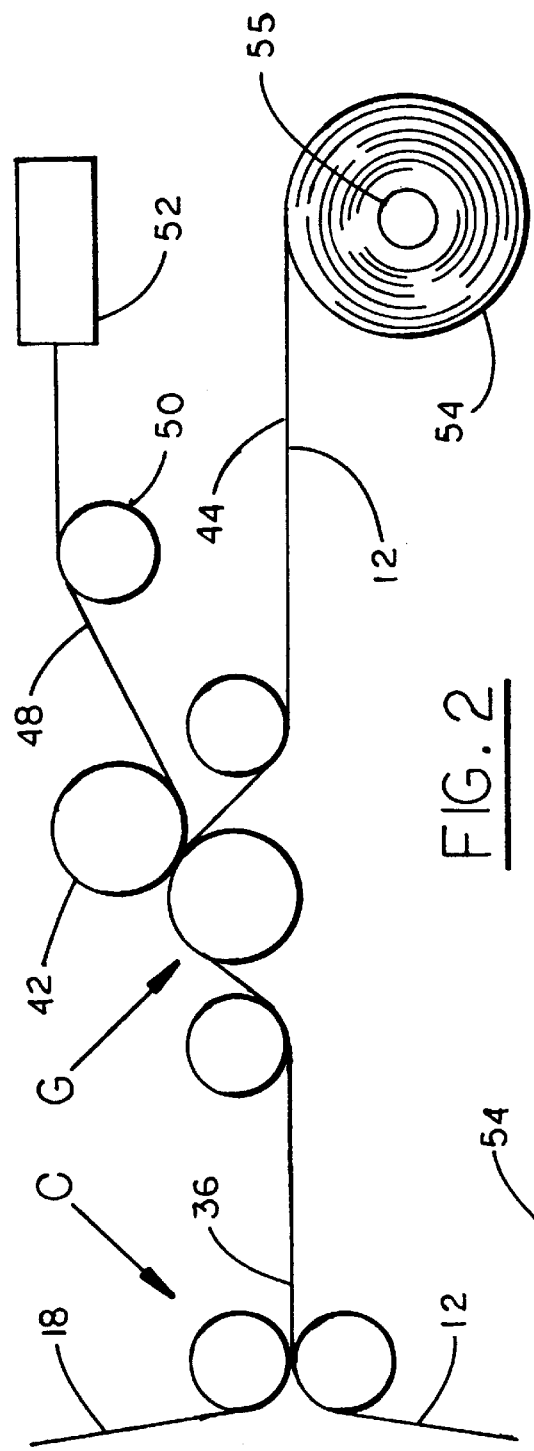
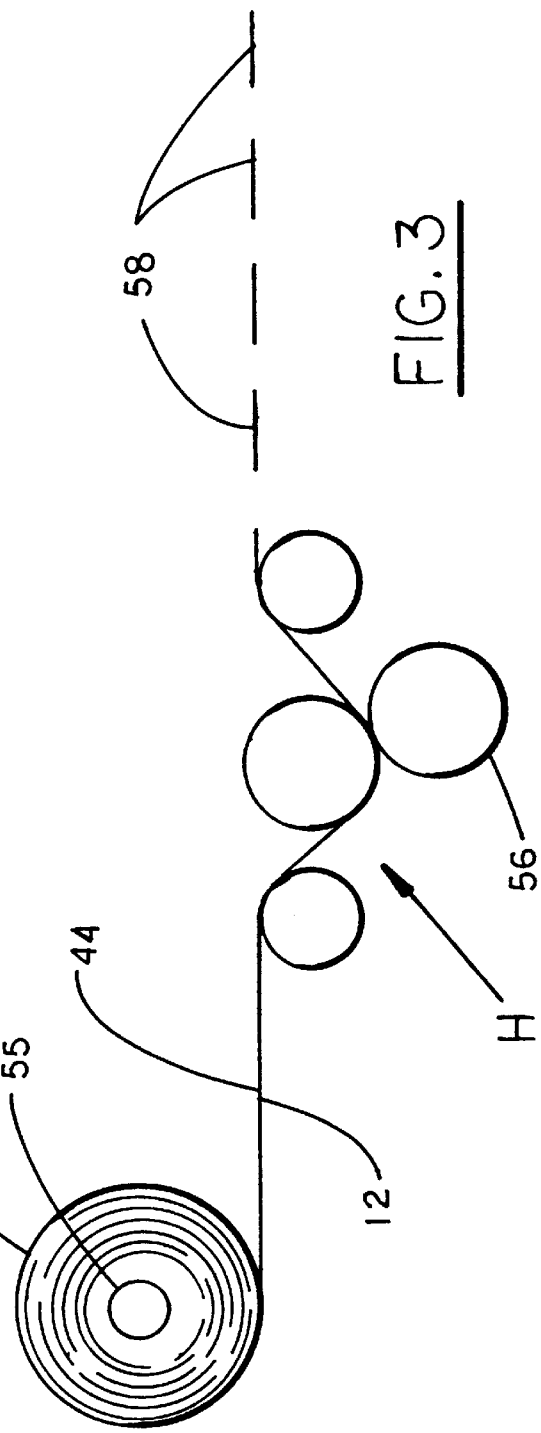
FIG. 2
FIG. 3

METHOD OF FORMING ROLLS OF WEBS INCLUDING PERFORATED AND PEELABLE LID SHAPES

FIELD OF THE INVENTION

This invention relates generally to printing presses and, more particularly, to in-line presses which are adapted to process rolls of bonded-together webs including perforated and peelable lid shapes, wherein an inner web is formed to include dispensing holes, and an outer web is printed with selected indicia and peelably attached to the inner web or plurality of lids in cooperating registration therewith.

BACKGROUND ART

Ullrich et al U.S. Pat. No. 5,513,781 discloses a container closure assembly including a sifter, a peel-away liner, and a screw-on or snap-on closure cap. The method taught by Ullrich et al includes forming individual sifters and applying adhesive thereto, combining the two elements, and then applying the closure cap for transfer to a bottling site.

Nicol U.S. Pat. No. 2,776,787 discloses a can wherein one can end has openings formed therein, with an indicia-printed tab secured over the openings by a pressure sensitive adhesive. Prior to securing the individual tabs, each is separated at a weakened line from a continuous strip of tabs.

Forming multiple-layered laminated materials for packages for foodstuffs are disclosed in Frydendal U.S. Pat. No. 4,300,969 and Andersson U.S. Pat. No. 4,657,614. A foil rolling process for producing dual-layered thin gauge metal foil is disclosed in Monks U.S. Pat. No. 4,530,230.

DISCLOSURE OF THE INVENTION

A general object of the invention is to provide an improved method for manufacturing dual-layered webs suitable for being processed into perforated and peelably covered lids suitable for single use containers carrying particulates, such as spices, cheeses, and the like.

Another object of the invention is to provide dual bonded-together webs, wherein each outer web bears predetermined printed indicia and is adapted to being peelably attached to the inner web, and wherein each inner web is perforated in registration with the printed indicia.

A further object of the invention is to provide a continuous in-line method for producing dual, peelably-bonded-together webs wherein one web includes patterns of perforations formed therethrough, and the other layer includes selected indicia printed thereon and overlying the respective patterns of perforations.

A still further object of the invention is to provide a continuous, single line method for combining two webs of material, wherein one web is perforated and the other web is printed with selected indicia in cooperating registration therewith, and the latter web is die cut through to form individual peelable lids.

These and other objects and advantages will become more apparent when reference is made to the following drawings and the accompanying description.

BRIEF DESCRIPTION OF THE DRAWINGS

FIG. 2 is a fragmentary side diagrammatic view of an in-line printing press embodying an alternative inventive process;

FIG. 3 is a side diagrammatic view of an optional process step to supplement the product from the FIG. 2 process;

BEST MODE FOR CARRYING OUT THE INVENTION

Figure 1:
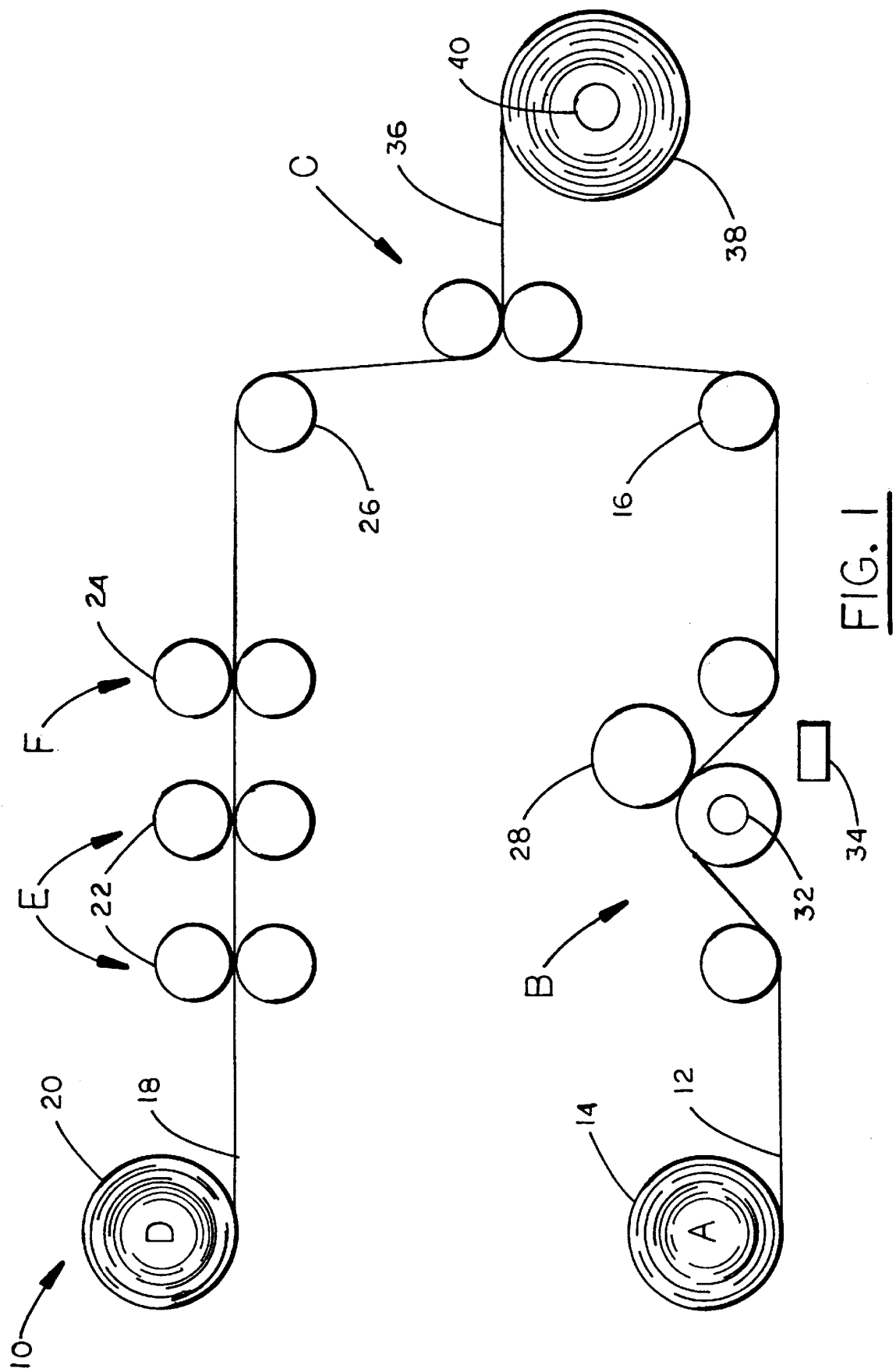
FIG. 1 is a side diagrammatic view of an in-line printing press embodying the inventive process.

FIG. 1 illustrates a continuous moving, in-line printing press 10 including a first web-loading station A supplying a first web 12 from a roll 14 of selected roll stock to a die cutter station B, and, thence, around, an idler roller 16 to a bonding station C. The press 10 includes a second web-loading station D supplying a second web 18 from a second roll 20 of selected roll stock to one or more colored ink-applying print stations E each including a suitable flexographic or other print unit 22, to produce predetermined printed indicia, represented as 23, and an adhesive-applying station F including an adhesive printer 24, in a predetermined progressive order, and, thence, around an idler roller 26 to the bonding station C. The adhesive printer 24 prints adhesive in a predetermined pattern on the web as it travels therepast. The pattern may consist of rings or solid circles spaced across the web, in preparation for the bonding station C.

Figure 4A:
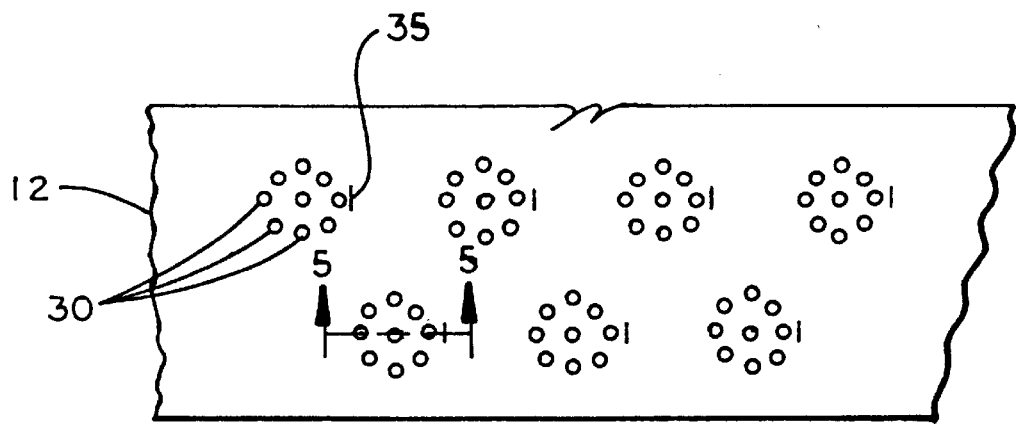
FIGS. 4A and 4B are enlarged fragmentary plan view of two webs processed by the FIG. 1 press.
Figure 4B:
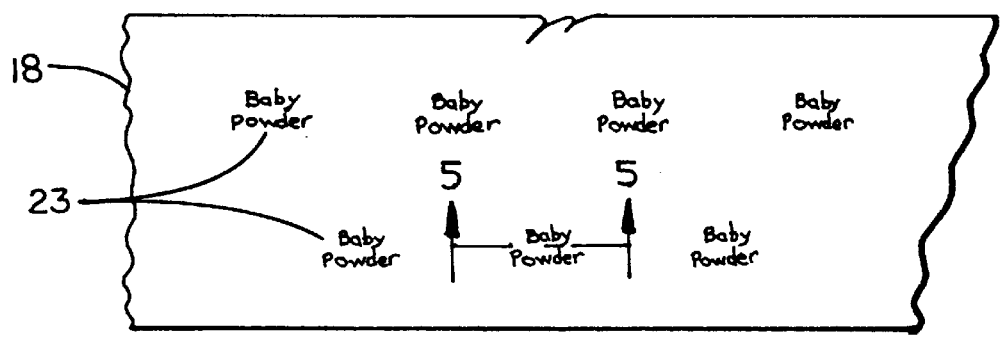

At the die cutter station B, typically, a roller-shaped die cutter 28 includes a plurality of circular cutters, of a predetermined diameter formed on the peripheral surface thereof for forming dispensing holes 30 in a predetermined pattern of, say, ten groups of holes across the web 12. As the web travels across the die cutter 28, vacuum from a source, represented as 32, beneath the die cutter 28 sucks the plugs from the holes 30 as they pass the die cutter, downwardly to a collection unit, represented as 34. Alternately, the source 32 may be a source of air under pressure, serving as an air eject blower to blow the plugs from the holes 30 outwardly. Each group of holes 30 includes a center hole surrounded by a predetermined number, say eight equally spaced holes (FIG. 4A). Additionally, the die cutter 28 may include lateral blades for forming a slit or separation cut 35 (FIG. 4) adjacent a predetermined portion of the periphery of each group of holes, for a purpose to be described.

Figure 5:
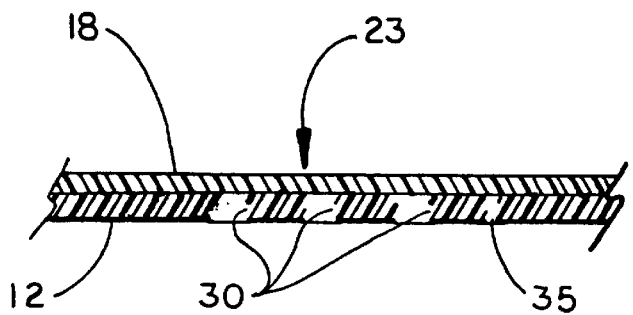
FIG. 5 is an enlarged fragmentary side elevational view in partial cross section of the assembled webs of FIG. 4.

After passing a further idler roller 26, at the bonding station C, the web 18 becomes peelably bonded to the web 12, to form a dual layered web 36, with the printed indicia overlying respective groups of holes 30 (FIG. 5). The bonded together webs are wound into a roll 38, around a suitable tube 40, ready to be shipped to "form, fill and seal" customers.

Figure 6:
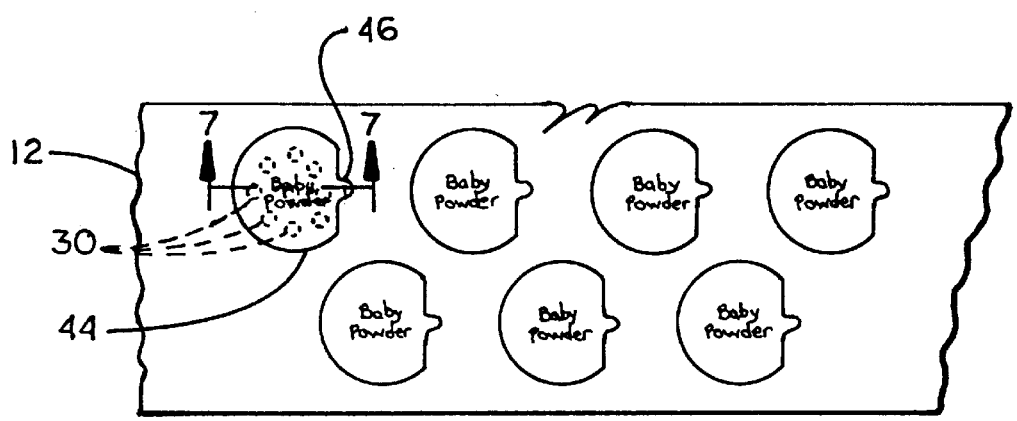
FIG. 6 is an enlarged fragmentary plan view of a web and lids processed by the FIG. 2 press.
Figure 7:
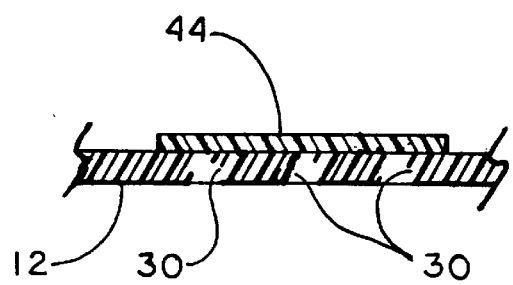
FIG. 7 is an enlarged fragmentary side elevational view of the assembled web and lids of FIG. 6.

Referring now to FIG. 2, elements thereof are substantially the same as those of FIG. 1, and bear the same reference numerals. A second die cut station G follows the bonding station C. At station G, and overhead die cutter 42 cuts through the overlying web 18 a lateral row of peelable lid shapes 44 (FIG. 6 and 7) around the respective printed indicia 23 and with the underlying groups of holes 30 centrally located relative thereto. A lift tab 46 (FIG. 6) is cut to extend beyond the periphery of the adhesive pattern. Waste material 48 of the web 18 between the lid shapes 44 is outside of the adhesive pattern and the tab 46 and, therefore, is not bonded to the underlying perforated web 12. Such waste material is directed upwardly either around a remote roller 50, or over the roller so as to be sucked into a vacuum pickup, including a bailor and vacuum source, represented as 52. The now combined underlying web 12 and overlying lid shapes 44 is wound into a roll 54, around a suitable tube 55, ready to be shipped to customers.

Figure 8:
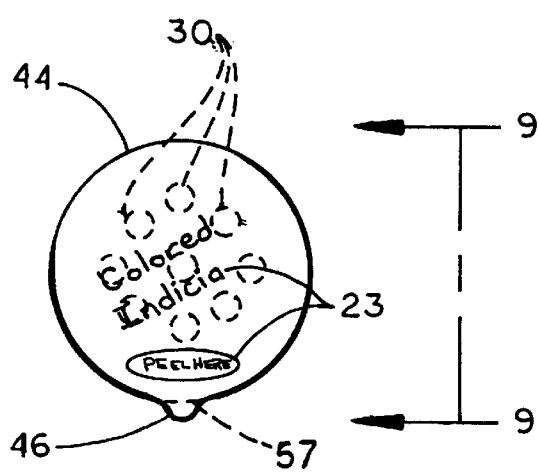
FIG. 8 is a plan view of the dual-layered lids processed by the FIG. 3 step.
Figure 9:
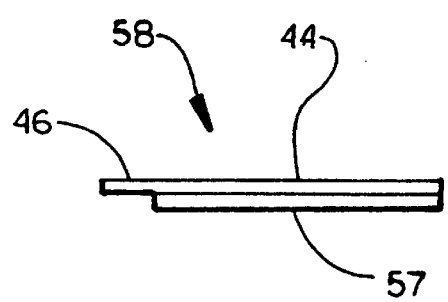
FIG. 9 is an end view taken along the plane of the line 9—9 of FIG. 8, and looking in the direction of the arrows.

In lieu of shipping the roll 54, it may be taken off line to a reciprocating die cutter station H, where it is unrolled to pass over a die cutter 56 where the underlying web 12 is cut around the overlying peelable label shapes 44, forming bottom lids 57 (FIG. 9). As such, the resultant dual-layered lids 58 (FIGS. 8 and 9) are conveyed to a station (not shown) where they are stacked and placed in shipping containers to be shipped to particular customers.

Figure 10:
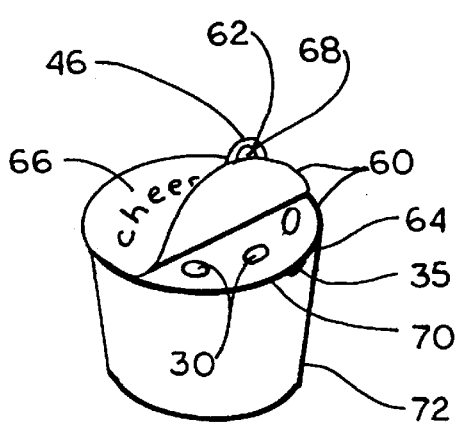
FIG. 10 is a perspective view of the final lid structure formed from the two webs of FIG. 5 as mounted on a plastic container.

Referring now to FIG. 10, it is noted that dual-layered lids 60 subsequently cut from the roll 38 of processed webs 12 and 18 has dual tabs 46 and 62, the latter formed beyond the slit or separation cut 35 adapted to breaking away from the remainder of the perforated lid 64 to become peeled off with the outer peelable lid 66, along with a solid plastic breakaway tab 68, broken away along a pre-broken line 70 across the tab 68, such as may currently be found on a single-layered lid of, for example, a plastic jam container 72 in many restaurants. The tabs 68 and 62 remain with the tab 46.

It should be noted that the web 12 may be formed of any suitable laminate paper or a thermoplastic material, or it may be a sheet coated on the underside thereof with such a material, say, polyethylene, so that the dispensable-food stuffs manufacturer who receives the roll of dual-layered webs, or the underlying web and overlying peelable lids, or the individual dual-layered lids, places same on the open top edge of his spice or cheese or other particulate product container, heats the outermost peripheral edge, around the peelable lid, to bond the perforated lids to the container, now ready for use as a single serving by an ultimate consumer. The consumer removes the peelable outer lid to expose the dispensing holes 30 in the underlying lid. One or both the webs 12 and 18 may consist of a foil and/or paper-plastic material, with suitable bonding materials added thereto for laminating and/or sealing on the peripheral edge of the final filled container.

If it were desired for a particular lid application, well known turn bars (not shown) may be employed both before or after one of the print stations to turn the web 18 over for a selected printing of, for example, a prize designation or other indicia, on the underside, and then returned right-side-up. Alternatively, without turning the web over, a jet printer may be employed adjacent the underside.

Referring now to FIG. 10, there is illustrated a finished individual dual-layered lid 58 mounted on a single use container, which may be filled with shakable spice, cheese, or other particulates, for use by the ultimate individual consumer.

INDUSTRIAL APPLICABILITY

It should be apparent that the invention provides improved, novel, continuous moving, in-line methods for producing improved, practical and readily usable rolls of dual-layer lids, or the finished dual-layer lids, wherein the outer lid includes any desirable printed indicia and/or logos and is peelably bonded to the inner lid, wherein the latter has dispensing holes formed therein.

It should be further apparent that the adhesive applying station could be located adjacent the first web 12, so as to apply the adhesive to the upper surface thereof around the respective groups of holes formed therein.

It should be still further apparent that the in-line press may include a series of alternate upper and lower rollers for feeding either or both webs, and conventional heater and blow drier units in combination with the printing units, serving to dry the respective printed indicia and adhesive patterns during high speed production runs.

While but three general embodiments of inventive methods have been shown and described, other modifications thereof are possible within the scope of the following claims. If necessary for a particular application, more than two webs could be involved.

What is claimed is:

1. A method of producing rolls of multi-layered webs, said method comprising the steps of providing at least two individual webs of selected materials to a printing press; die cutting a plurality of groups of holes in a predetermined pattern in one of the webs; printing predetermined indicia on at least one face of the other web; printing an adhesive on one of the webs; bonding the webs together with the adhesive, the indicia, and the plurality of groups of holes in registration with one another; die cutting said other web after bonding to form spaced-apart peelable lid shapes only in said other web both laterally across and longitudinally along said other web; and then forming the webs which have been bonded together and then die cut into a roll.

2. The method described in claim 1, wherein the printing of the adhesive is on said other web in registration with the printed indicia.

3. The method described in claim 1, wherein the printing of the adhesive is on the web with said plurality of groups of holes in registration with the plurality of groups of holes.

4. The method described in claim 1, wherein the die cutting steps forms a slit adjacent each said group of holes.

5. A method of producing dual-layered rolls of webs, said method comprising the following steps:

a. providing a first web from a first roll of selected roll stock;

b. feeding the first web to a first die cut station, and die cutting sets of holes along the longitudinal extent of the first web;

c. providing a second web from a second roll of selected roll stock;

d. feeding the second web to a printing station of a printing press, and printing indicia on the second web at selected locations along the longitudinal extent of the second web;

e. applying patterns of adhesive on one of said first and second webs along the longitudinal extent in registration with one of said sets of holes and said indicia;

f. feeding the first web to a bonding station;

g. feeding the second web to the bonding station to cover the first web and bonding the webs together with said sets of holes in registration with said indicia;

h. feeding the bonded-together webs to a second die cut station;

i. die cutting at the second die cut station predetermined shapes through the second web only around each location of the printed indicia to form peelable lids;

j. removing the portion of the second web from around the peelable lids; and k. rolling the webs formed after step j into a roll.

6. The method described in claim 5 further comprising the step of feeding the first web and peelable lids from the roll to a third die cut station, and die cutting predetermined shapes through the first web only to form lids where each of the lids in the first web corresponds to one of the lids of the second web; and removing the portion of the first web from around the lids therein.

7. The method described in claim 5, wherein the step of removing the portion of the second web is accomplished by one of (1) a vacuum pick-up means and (2) by winding the portion onto a remote roller.

8. A method of producing rolls of multiple-layered webs, said method comprising the steps of providing at least two individual webs of selected materials to a printing press; performing predetermined operational steps on the webs including printing predetermined indicia on at least one face of at least one of the webs, printing a peelable adhesive on one of the webs; peelably bonding the webs together with the adhesive and the indicia in registration with one another; die cutting one of said webs after bonding to form spaced-apart peelable lid shapes only in said die cut web both laterally across and longitudinally along said die cut web; and then forming the webs which have been bonded together and then die cut into a roll.

9. The method described in claim 8, wherein the printing of the peelable adhesive is on the web which has printed indicia thereon in registration with the printed indicia.

10. The method described in claim 8 further comprising the step of unrolling the rolled webs and die cutting the web not cut by said die cutting step which forms said peelable lid shapes to form lids where each of the lids in the first web corresponds to one of the lids of the second web.

* * * * *